United States Patent
Fron et al.

(10) Patent No.: US 12,315,025 B2
(45) Date of Patent: May 27, 2025

(54) DIAGNOSTIC ONLINE RESULT ASSESSMENT (DORA) IN A CLOUD ENVIRONMENT

(71) Applicant: Snowflake Inc., Bozeman, MT (US)

(72) Inventors: Edward J. Fron, Denver, CO (US); Nicholas A. Goodman, Durango, CO (US); Kristl Smith Tyler, Spokane, WA (US)

(73) Assignee: Snowflake Inc., Bozeman, MT (US)

( * ) Notice: Subject to any disclaimer, the term of this patent is extended or adjusted under 35 U.S.C. 154(b) by 225 days.

(21) Appl. No.: 18/047,909

(22) Filed: Oct. 19, 2022

(65) Prior Publication Data

US 2024/0135477 A1   Apr. 25, 2024
US 2024/0233055 A9   Jul. 11, 2024

(51) Int. Cl.
  G06Q 10/10      (2023.01)
  G06F 21/54      (2013.01)
  G06Q 10/08      (2024.01)
  G06Q 10/083     (2024.01)
  G06Q 50/20      (2012.01)

(52) U.S. Cl.
  CPC ........... *G06Q 50/205* (2013.01); *G06F 21/54* (2013.01)

(58) Field of Classification Search
  CPC .............................. G06Q 50/205; G06F 21/54
  USPC .................................................. 705/1.1–912
  See application file for complete search history.

(56) References Cited

U.S. PATENT DOCUMENTS

| | | | | |
|---|---|---|---|---|
| 8,406,682 B2* | 3/2013 | Elesseily | ............... | G09B 19/00 434/350 |
| 8,924,539 B2* | 12/2014 | Ferris | .................... | G06F 9/5072 709/224 |
| 9,626,875 B2* | 4/2017 | Gal | .......................... | G09B 5/08 |
| 9,767,312 B2* | 9/2017 | Sahoo | ................ | H04L 41/5054 |
| 2014/0065592 A1* | 3/2014 | Strang | ...................... | G09B 5/00 434/350 |
| 2019/0251477 A1* | 8/2019 | Crosta | ..................... | G06Q 50/20 |
| 2019/0320038 A1* | 10/2019 | Walsh | ..................... | H04L 67/10 |
| 2019/0355269 A1* | 11/2019 | Pan | ......................... | G06F 18/22 |
| 2021/0026687 A1* | 1/2021 | Miller | .................. | G06F 9/5038 |

(Continued)

OTHER PUBLICATIONS

Kermek et al_"Process Model Improvement for Source Code Plagiarism Detection in Student Programming Assignments". Informatics in Education; Vilnius vol. 15, Iss. 1, (2016): 103-126. (Year: 2016).*

*Primary Examiner* — Jonathan P Ouellette
(74) *Attorney, Agent, or Firm* — Schwegman Lundberg & Woessner, P.A.

(57) ABSTRACT

Provided herein are systems and methods for automated, secure, and credential-less evaluation (e.g., grading) of data processing task results (e.g., student/learner data processing lab result or assignment completion result) in a cloud environment using a learning management system (LMS). For example, a method includes detecting verification request code received from an account of a data consumer. The verification request code includes a call to an external function and a query statement associated with a task result obtained after completion of a data processing task. The verification request code is revised with metadata to obtain revised verification request code. The call to the external function is executed to cause an evaluation of the task result. A notification of a result of the evaluation is communicated to the account of the data consumer.

30 Claims, 12 Drawing Sheets

(56) References Cited

U.S. PATENT DOCUMENTS

2021/0173678 A1\* 6/2021 Levy .................... G06F 8/20
2022/0366277 A1\* 11/2022 DeFilippo ............ G06Q 30/016

\* cited by examiner

```
"sf-context-current-timestamp": "2022-06-10 11:03:51.981000000Z",
"sf-context-current-account": "XG64763",
"sf-context-current-statement": "select
DEMO_DB.PUBLIC.GRADER(step, (actual=expected), actual,
expected, description)
as graded_results from (SELECT 'DWW05' as step ,(select
count(*) from
GARDEN_PLANTS.INFORMATION_SCHEMA.TABLES where
table_name = 'VEGETABLE_DETAILS') as actual ,1 as expected
,'VEGETABLE_DETAILS table exists' as description)",
```

FIG. 7

DIAGNOSTIC ONLINE RESULT ASSESSMENT (DORA) IN A CLOUD ENVIRONMENT

TECHNICAL FIELD

Embodiments of the disclosure relate generally to databases and, more specifically, to diagnostic online result assessment (DORA) in a cloud computing environment with a learning management system (LMS).

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented and others. Secure storage and access of database data may be provided by encrypting and/or storing data in an encrypted form to prevent unauthorized access. In some cases, database systems include LMS functionalities which can include different grading solutions for student-completed tasks or assignments.

BRIEF DESCRIPTION OF THE DRAWINGS

The present disclosure will be understood more fully from the detailed description given below and from the accompanying drawings of various embodiments of the disclosure.

FIG. 7 illustrates an example revised verification request code generated by the learner grading component of FIG. 6, in accordance with some embodiments of the present disclosure.

DETAILED DESCRIPTION

Figure 1:
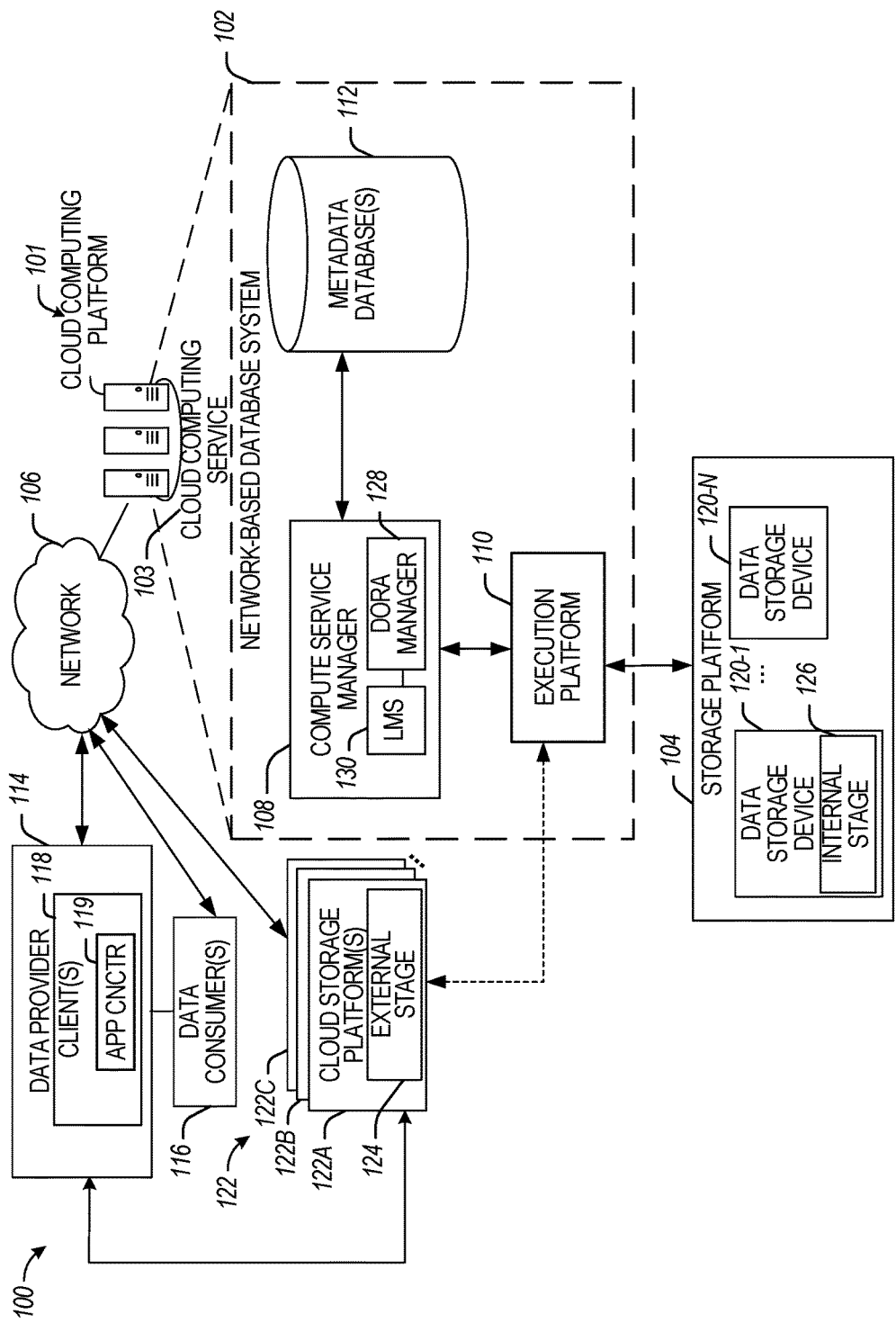
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "view" indicates a named SELECT statement, conceptually similar to a database table. In some aspects, a view can be secure, which prevents queries from getting information on the underlying data obliquely.

Aspects of the present disclosure provide techniques for diagnostic online result assessment (DORA) that automates the grading of data processing tasks in an LMS (e.g., online course work, online lab work, online coding assignment, or other data processing tasks), validating the task result obtained after a student (also referred to as a learner) completes the data processing task (or a series of data processing tasks) required to earn a badge (also referred to as a credential). In some embodiments, the disclosed techniques are performed by a DORA manager, without requiring password or credential exchange with a user account (e.g., an account of a data consumer using the services of a data provider).

Existing solutions for data processing task result evaluation (e.g., grading solutions) use one or both of the following techniques: (a) ask for credentials to the cloud or software account of the user to be able to connect to and "interrogate" the system for validation of the hands-on exercises; and (b) ask for the student to generate a report (e.g., screenshots or other output from the system), and submit the report to be reviewed by a human for grading and earning a credential. Such techniques, however, are inefficient and can be associated with data privacy concerns.

In some embodiments, the disclosed DORA manager can be configured with different components (e.g., as discussed in connection with FIGS. 4-11) which perform data processing task completion result evaluation, fraud detection, notification, and credential issuance functionalities. The disclosed DORA manager can be associated with the following advantages over the existing solutions:

(a) No human interaction is necessary for a learner to complete labs e.g., data processing tasks), request grading, and have the credential issued.

(b) The DORA manager requires no authentication or access to the learner account (e.g., the account of the data consumer at a network-based database system) (e.g., the result evaluation is performed using credential-less functionalities). DORA code (e.g., task result evaluation code) is run in the account of the data provider. By using the strong guarantees of external function headers, the DORA manager can guarantee the validity of the code, the account it is run from, and the validity of results without access to the data consumer account.

(c) The DORA manager provides real-time feedback for grading (e.g., evaluation of the task result). The account of the data consumer can run the check code (also referred to as verification request code) continuously throughout the course associated with the data processing task, and obtain real-time visual feedback (e.g., a pass indication or a fail indication) from the grading system (e.g., a component of the DORA manager) if the current project work meets the validity criteria. In this regard, grading is available through multiple SQL interfaces (including notebooks, connectors, Classic®, and Snowsight®) and is not dependent on running/receiving feedback to one user interface (UI).

(d) The DORA manager can check for fraud and tampering issues to ensure that the check code (or the verification request code) is matched to the submitted results (e.g., the task result).

In some aspects, the DORA manager is configured to provide learners with constant feedback, validate securely the task results, and issue badges (or credentials) at scale without any of the tampering or latency of user captured/submitted results.

The various embodiments that are described herein are described with reference where appropriate to one or more of the various figures. An example computing environment using a DORA manager for configuring automated, secure, credential-less evaluation (grading) of data processing task results is discussed in connection with FIGS. 1-3. Example configuration and functions associated with the DORA manager are discussed in connection with FIGS. 4-11. A more detailed discussion of example computing devices that may be used in connection with the disclosed techniques is provided in connection with FIG. 12.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, storage platforms 104, and cloud storage platforms 122 (which can include cloud storage platforms 122A, 122B, . . . , 122C). The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the MT-related functions described herein). The cloud computing platform 101 may include a three-tier architecture: data storage (e.g., storage platforms 104 and 122), an execution platform 110, and a compute service manager 108 providing cloud services (e.g., services associated with sharing of unstructured data stored in stages as configured and executed by the data sharing manager 128).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/ or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files (e.g., unstructured data files) that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the network-based database system. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files. Additionally, data stored in internal stages (e.g., internal stage 126) can be managed by the network-based database system, and data stored in external stages (e.g., external stage 124) can be managed by an account of a data provider (e.g., data provider 114).

As shown, the network-based database system 102 of the cloud computing platform 101 is in communication with the cloud storage platforms 104 and 122 (e.g., AWS®, Microsoft Azure Blob Storage®, or Google Cloud Storage), client devices (or clients) 118 of a data provider 114, and clients of a data consumer 116 (also referred to as user 116) via network 106. The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed unstructured data sharing functions) to multiple client accounts, including an account of the data provider 114 associated with client devices 118 (also referred to as a client device 118) and an account of the data consumer 116. In some embodiments, the compute service manager 108 comprises the DORA manager 128 which can be used in connection with functions discussed herein related to the automated, secure, credential-less evaluation of data processing task results. For example, the compute service manager 108 can also be configured with a learning management system (LMS) 130. The LMS 130 can be used to provide education services to the data consumer 116 (e.g., via a device associated with the data consumer), including online classes, credential-earning tasks, or other classes or coursework collectively referred to as database processing tasks that a user can complete. The DORA manager 128 can perform the administering of the database processing tasks, the evaluation (or grading) of the task result, notifying the user of the task result evaluation, performing fraud verification and detection, and performing credential issuance based on the evaluation. A more detailed description of the functions provided by the DORA manager 128 is provided in connection with FIGS. 4-11.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 118. The client device 118 corresponds to a user of one of the multiple client accounts (e.g., a data provider 114) supported by the network-based database system 102. The data provider may utilize application connector 119 at the client device 118 to submit data storage, retrieval, and analysis requests to the compute service manager 108 as well as to access or configure other services provided by the compute service manager 108 (e.g., services associated with the disclosed unstructured data sharing functions).

Client device 118 (also referred to as user device 118) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 118 operated by such users. For example, a notification to a user may be understood to be a notification transmitted to client device 118, input or instruction from a user may be understood to be received by way of the client device 118, and interaction with an interface by a user shall be understood to be interaction with the interface on the client device 118. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 118 to access functions offered by the data provider 114. Additionally, the data consumer can access functions (e.g., the DORA-related functions of the DORA manager 128) offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of processed data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. These data communication networks may utilize any communication protocol and any type of communication medium. In some embodiments, the data communication networks are a combination of two or more data communication networks (or sub-Networks) coupled with one another. In alternate embodiments, these communication links are implemented using any type of communication medium and any communication protocol.

The compute service manager 108, metadata database 112, execution platform 110, and storage platform 104, are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
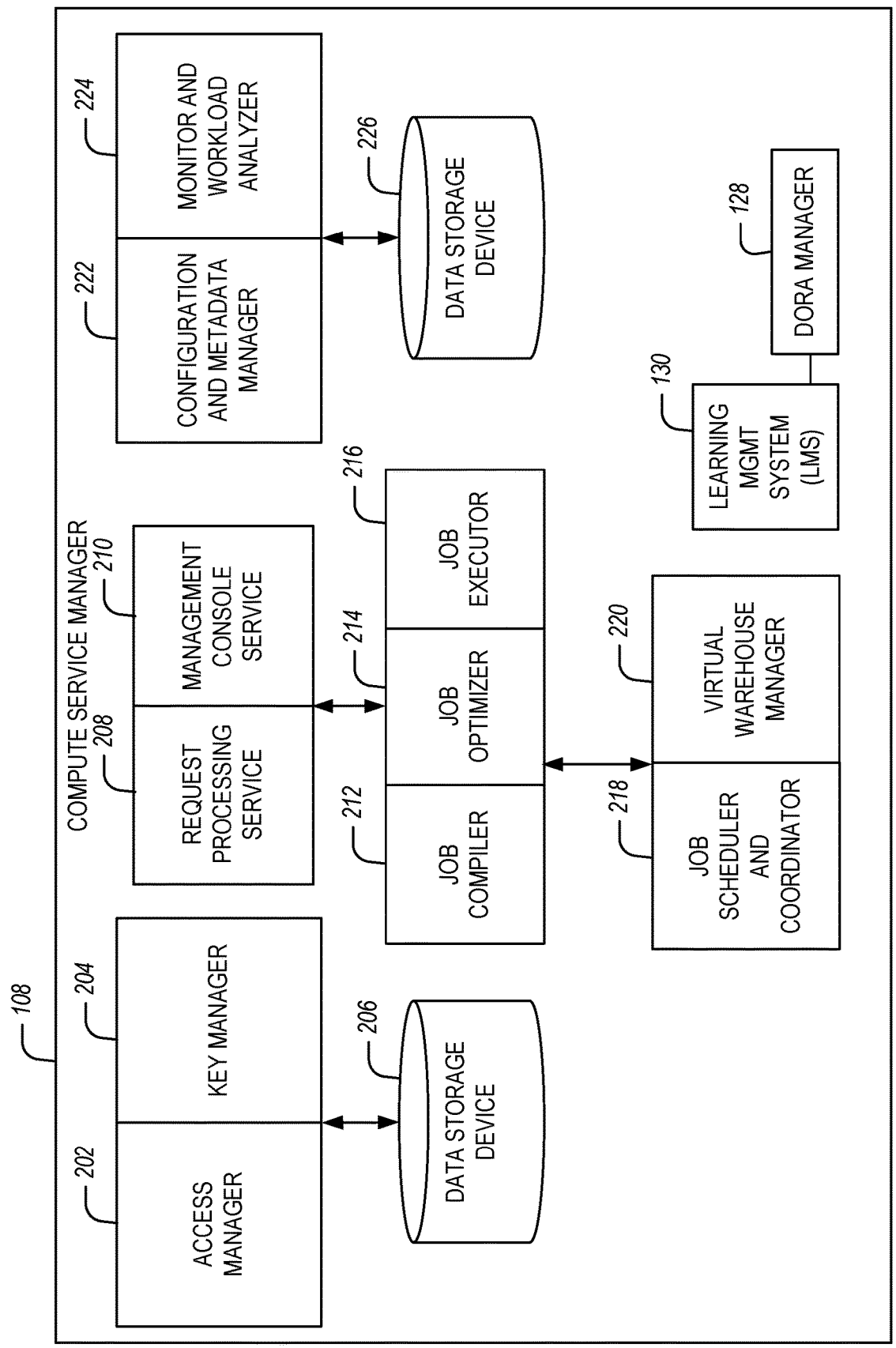
FIG. 2 is a block diagram illustrating the components of a compute service manager using a DORA manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the data sharing manager 128 and the LMS 130 which can be used in connection with unstructured data sharing functions discussed herein.

Figure 3:
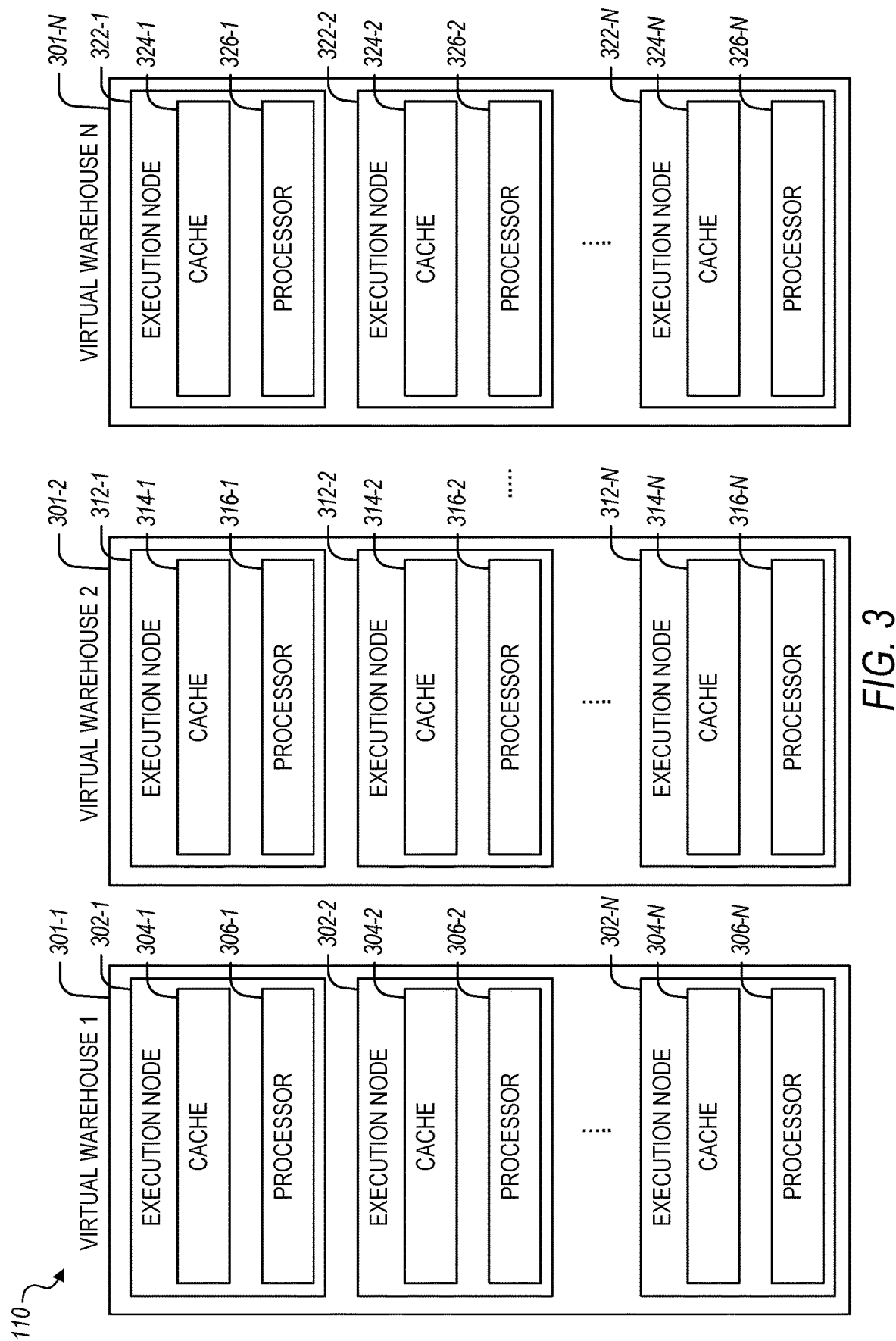
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
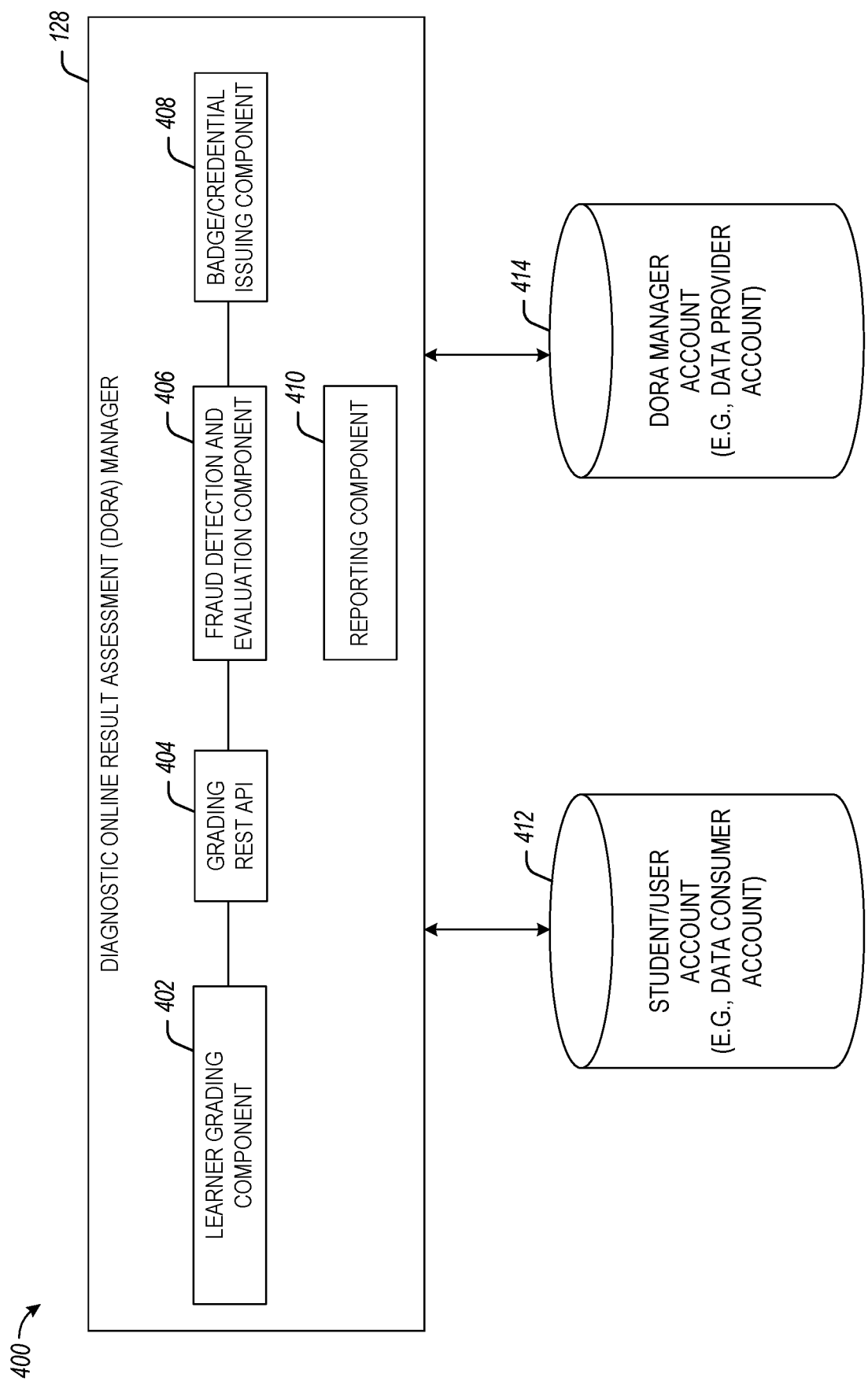
FIG. 4 is a block diagram of the DORA manager used in the network-based database system of FIG. 1, in accordance with some embodiments of the present disclosure.

FIG. 4 is a block diagram 400 of the DORA manager 128 used in the network-based database system of FIG. 1, in accordance with some embodiments of the present disclosure. Referring to FIG. 4, the DORA manager 128 includes a learner grading component 402, a grading Rest API 404, fraud detection and evaluation component 406, a badge (e.g., credential) issuing component 408, and a reporting component 410.

The DORA manager 128 is in communication with a student/user account 412 (also referred to as a data consumer account 412) and a DORA manager account 414 (also referred to as a data provider account 414).

The learner grading component 402 comprises suitable circuitry, interfaces, and/or code and is configured to provide the following functionalities: (a) enabling a user to install code for API integration; (b) enabling a user to install code to create an external function (e.g., a GRADER external function) for performing evaluation (e.g., grading) of data processing task results (e.g., results of completed online courses, lab work, coding assignment, or other data processing tasks); (c) provide verification request code which the user can use by submitting a task result for review and evaluation (e.g., via an API call to the external function); and (d) revise the verification request code to include metadata which can be used for the result evaluation and fraud detection. A more detailed description of the learner grading component 402 is provided in connection with FIGS. 5-7.

The grading Rest API 404 comprises suitable circuitry, interfaces, and/or code and is configured to provide the following functionalities: (a) receive a request (e.g., revised verification request call) with external function call from multiple users; (b) perform the task result evaluation; (c) provide real-time notification of the result/outcome of the evaluation; and (d) forward the received request to the fraud detection and evaluation component 406 and the badge (e.g., credential) issuing component 408 for further evaluation and detection of fraud as well as tracking and issuance of badges (or credentials). A more detailed description of the grading Rest API 404 is provided in connection with FIG. 8.

The fraud detection and evaluation component 406 comprises suitable circuitry, interfaces, and/or code and is configured to provide fraud detection functionalities associated with data processing tasks completed by users.

The badge issuing component 408 comprises suitable circuitry, interfaces, and/or code and is configured to provide functionalities associated with tracking user progress towards obtaining a credential as well as awarding/issuing credentials based on completed and verified data processing task results. A more detailed description of the fraud detection and evaluation component 406 and the badge issuing component 408 is provided in connection with FIG. 9.

The reporting component 410 comprises suitable circuitry, interfaces, and/or code and is configured to provide reporting functionalities associated with completed data processing tasks. A more detailed description of the reporting component 410 is provided in connection with FIG. 10.

Figure 5:
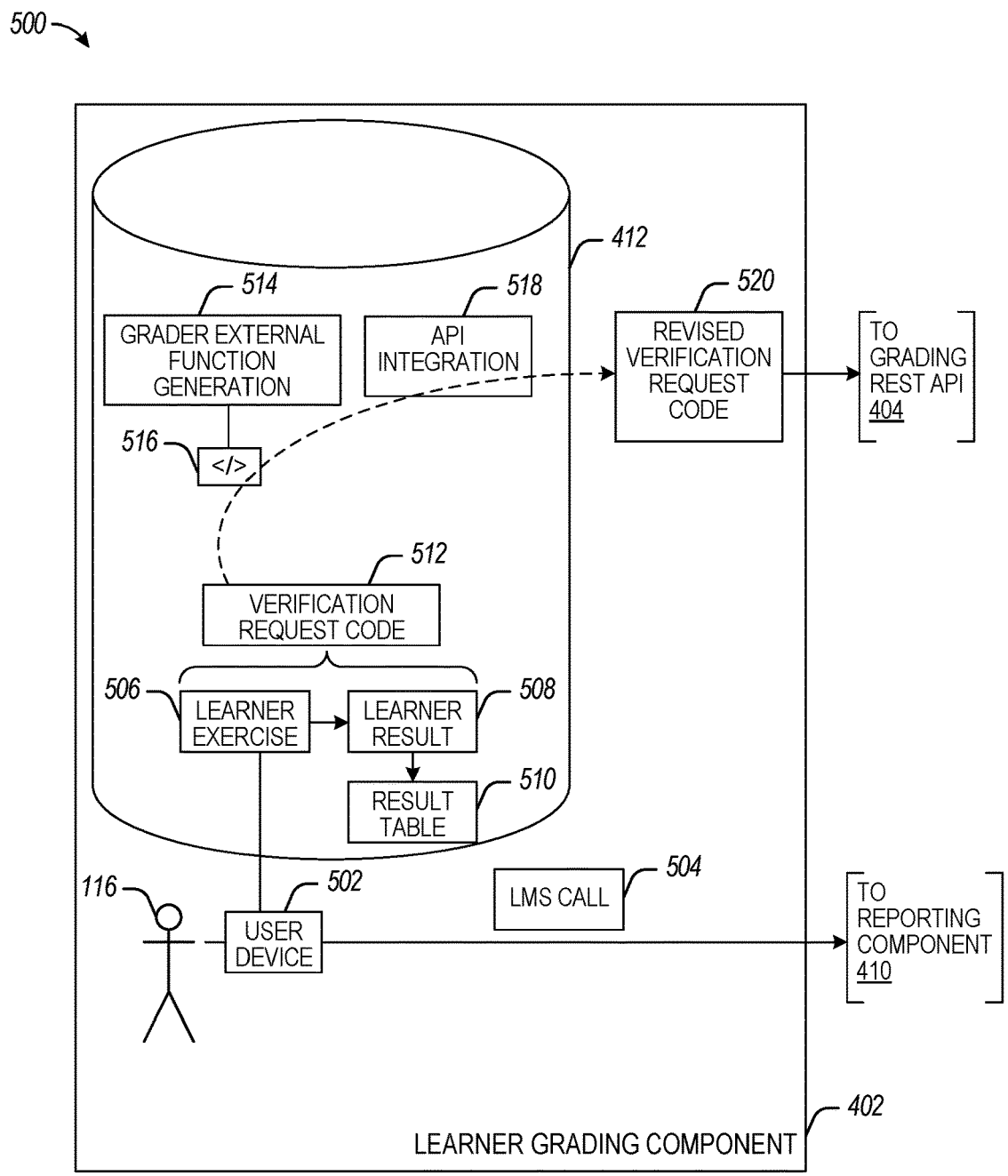
FIG. 5 is a block diagram of a learner grading component of the DORA manager used in the network-based database system of FIG. 1, in accordance with some embodiments of the present disclosure.

FIG. 5 is a block diagram 500 of the learner grading component 402 of the DORA manager 128 used in the network-based database system of FIG. 1, in accordance with some embodiments of the present disclosure.

The learner grading component 402 is configured to perform API integration 518 and install a pointer to a Rest API service via an external function (e.g., external function 516 configured as a result of external function generation 514). In some embodiments, this functionality is achieved by issuing SQL commands (e.g., commands contained in a query statement to point an external function to an external function managed by an account of a data provider via AWS Lambda function). This process can be performed once and will allow the DORA manager 128 to grade any number of assignments within the data consumer account 412 when the learner runs their check code (also referred to as verification request code 512).

Table 1 below illustrates an example code that can be provided to the user by the learner grading component 402 for performing the API integration 518.

TABLE 1 create or replace api integration dora_api_integration
api_provider = aws_api_gateway
api_aws_role_arn =
'arn:aws:iam::321463406630:role/snowflakeLearnerAssumedRole'
enabled = true
api_allowed_prefixes =
('https://awy6hshxy4.execute-api.us-west-2.amazonaws.com/dev/edu_dora');

Table 2 below illustrates an example code that can be provided to the user by the learner grading component 402 for performing the external function generation 514 and configuring the external function 516 (e.g., a GRADER external function).

TABLE 2 create or replace external function
demo_db.public.grader(
  step varchar
  , passed boolean
  , actual integer
  , expected integer
  , description varchar)
returns variant
api_integration = dora_api_integration
context_headers = (current_timestamp,current_account,current_statement)
as
'https://awy6hshxy4.execute-api.us-west-2.amazonaws.com/dev/edu_dora/grader'
;

As seen in Table 2, the configuration of the external function 516 can include the parameters step (e.g., test identification), passed (e.g., the Boolean result of the evaluation), actual (e.g., link to the actual task result obtained by the user), expected (e.g., expected task result), and description (e.g., description of the task result, such as table name). The configuration of the external function 516 further includes context headers (or metadata), which can be inserted by the learner grading component 402. In some embodiments, the metadata can include identification information of the account of the data consumer, a current timestamp associated with the detecting of the verification request code, and a verified query statement that corresponds to the query statement in the verification request code 512 executed by the user to trigger the evaluation of the task result.

In operation, a user (e.g., data consumer 116) uses device 502 to perform a learner exercise 506 (also referred to as a data processing task 506) and obtain a learner result 508 (also referred to as task result 508). Task result 508 can include a result table 510. In some aspects, the learner grading component 402 can provide the user with verification request code 512, which can include a call to external function 516 as well as commands (e.g., SQL commands) in a query statement. The verification request code 512 is further revised by the learner grading component 402 to include metadata, and generate revised verification request code 520. The revised verification request code 520 is communicated (e.g., as an API request) to the grading Rest API 404 for further processing and evaluation of the corresponding test result.

In some embodiments, the data consumer account 412 can communicate (e.g., via the user device 502) an LMS call 504 to the reporting component 410. The LMS call 504 can include the evaluation of the task result (e.g., a passing indication or a failing indication), which can be used by the reporting component 410 to generate a report and perform further notifications related to completed data processing tasks.

The advantage of using an external function by the learner grading component 402 is that the check code (e.g., the verification request code 512) is not installed into the data consumer account 412 (instead, it is provided by the learner grading component 402). In this regard, the DORA manager 128 is leveraging the capability of external function 516 to execute remote code (which can remain secure and under the control of the account of the data provider). Notification of the evaluation of the task results can be based on the un-forgeable extra context headers (e.g., the metadata described above) which the learner grading component 402 infuses in the Rest API call ((e.g., example metadata includes current timestamp, current account, and current statement) so that the query statement in the verification request code 512 can be verified and the account from which the external function is called cannot be forged.

In some aspects, the learner grading component 402 of the DORA manager 128 provides the verification request code 512, which user 116 can cut, paste, and run from the data consumer account 412 based on the type of data processing task that is completed (e.g., based on the learner exercise 506).

Figure 6:
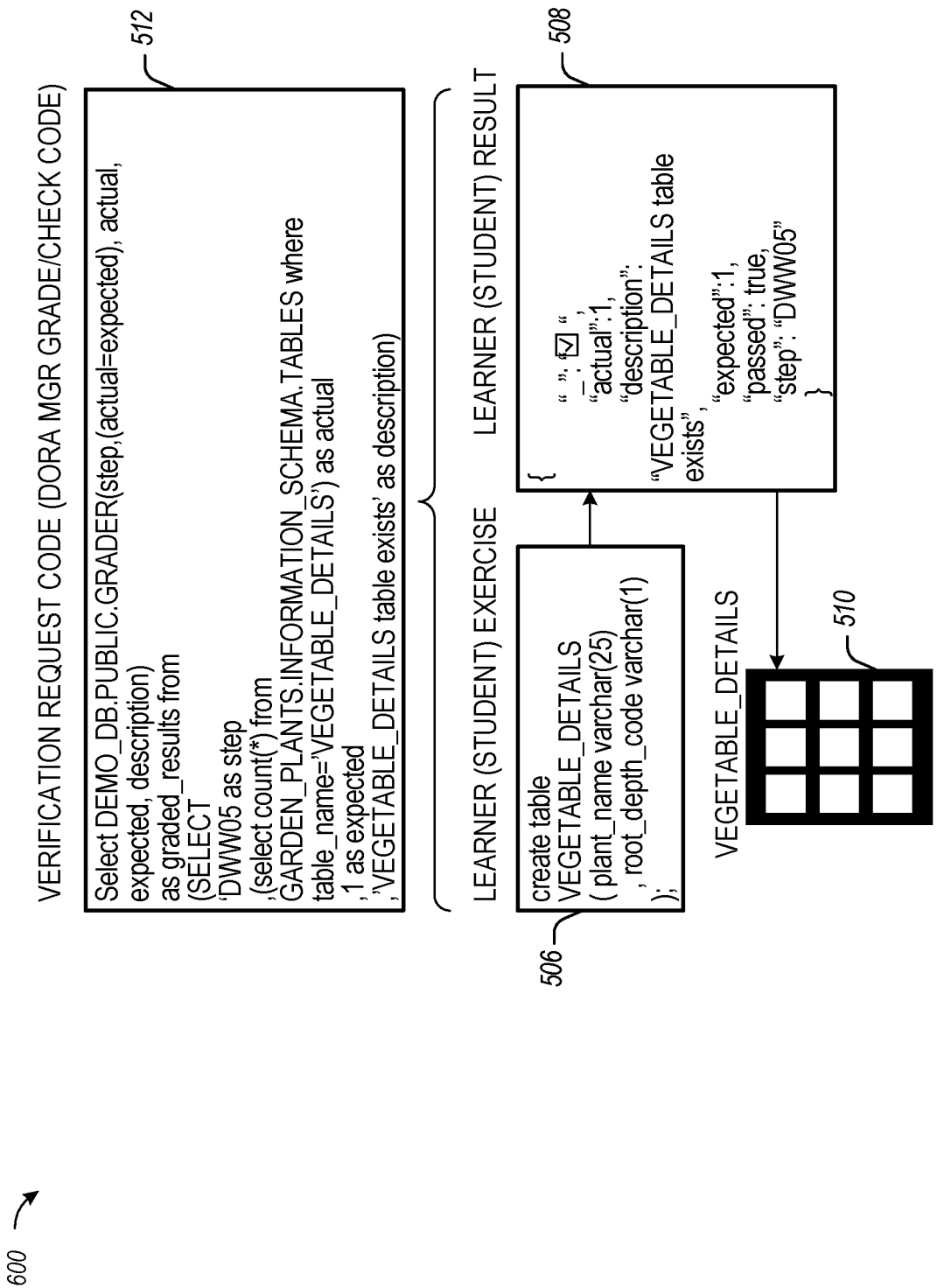
FIG. 6 illustrates an example verification request code based on a learner result based on the completion of a learner exercise, in accordance with some embodiments of the present disclosure.

FIG. 6 illustrates diagram 600 of example verification request code 512 based on a learner result 508 based on the completion of a learner exercise 506, in accordance with some embodiments of the present disclosure.

In some aspects, the learner grading component 402 can configure any set of query statements (e.g., as included in the verification request code 512) needed/wanted for each data processing task (e.g., course) administered and completed by the user 116. The user can view the query statement in the provided verification request code 512 to see what is being checked for and adjust their course work accordingly until they receive a passing notification after the evaluation of the task result is complete (e.g., by the grading Rest API 404). In this regard, the DORA manager 128 can provide prompt (e.g., in real-time) feedback as to whether the user has completed the data processing task correctly.

For instance, FIG. 6 illustrates an example verification request code 512 which would send to the grading Rest API 404 the SQL (e.g., query statement with SQL commands), and the task results if a user has created a table 510 named "VEGETABLE DETAILS" for a test named DWW05 (e.g., the 5th test in a DWW online course).

After the verification request code 512 is run, the revised verification request code 520 is generated by adding metadata. FIG. 7 illustrates an example revised verification request code 520 generated by the learner grading component of FIG. 6, in accordance with some embodiments of the present disclosure. More specifically, the verification request code 512 is revised by including metadata 702 to generate the revised verification request code 520. Metadata 702 includes identification information of the account of the data consumer, a current timestamp associated with the detecting of the verification request code, and a verified query statement that corresponds to the query statement in the verification request code 512 executed by the user to trigger the evaluation of the task result. For example, the verified query statement is the same query statement with SQL commands as originally provided to the user as verification request code 512 (prior to any potential tampering or changes made to such query statement).

Inserting the metadata 702 in the verification request code has the advantage that running the external function 516 with the infused context headers (e.g., current timestamp, current account, and current statement) is the learner submitting to the account of the data provider the SQL statement run, and the results of their valid checks without the data provider needing to access their account and run the grading code. The learner initiates and sends to the data provider the non-tamperable results (e.g., via the revised verification request code 520), without the data provider having access to the data consumer data or the data consumer account 412.

Figure 8:
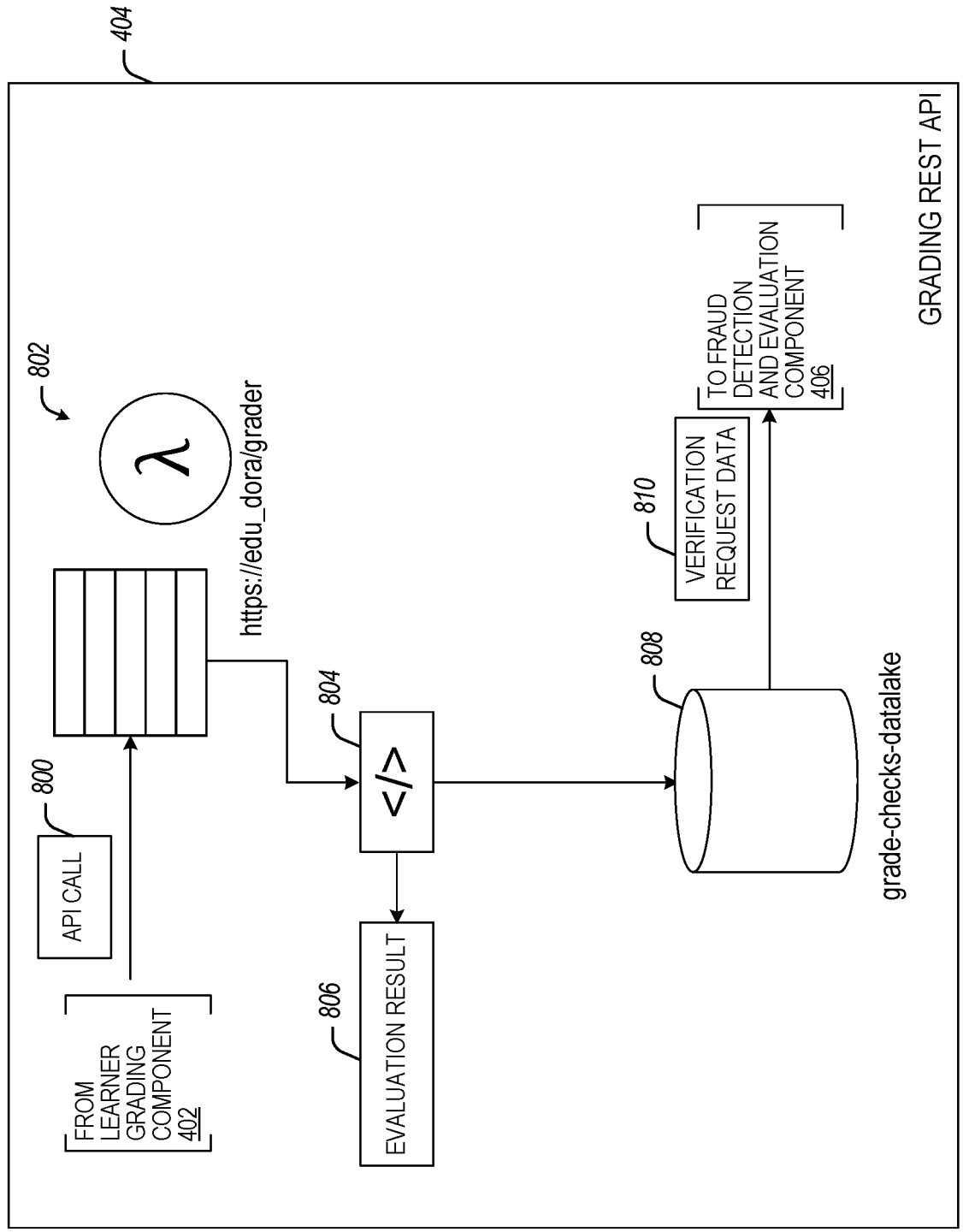
FIG. 8 is a block diagram of a grading Rest application programming interface (API) of the DORA manager used in the network-based database system of FIG. 1, in accordance with some embodiments of the present disclosure.

FIG. 8 is a block diagram of a grading Rest application programming interface (API) 404 of the DORA manager 128 used in the network-based database system of FIG. 1, in accordance with some embodiments of the present disclosure. Referring to FIG. 8, the grading Rest API 404 includes a function 802 (e.g., an AWS® Lambda function), which receives the revised verification request code 520 as API call 800 and executes an external function 804 to perform the data processing task result evaluation.

In some embodiments, the external function 804 receives the API call 800 for a user, and performs a task result validation by comparing the actual result to the expected result, captures and validates the context headers (e.g., metadata 702, and returns the evaluation result 806 in a variant. In addition to the return of individual results to the learner, the grading Rest API 404 component stores verification request data 810 (e.g., the entire verification request code including the SQL commands in the query statement and the metadata), stores it in the database 808, and pushes it to the fraud detection and evaluation component 406 and the badge issuing component 408 for further processing.

Figure 9:
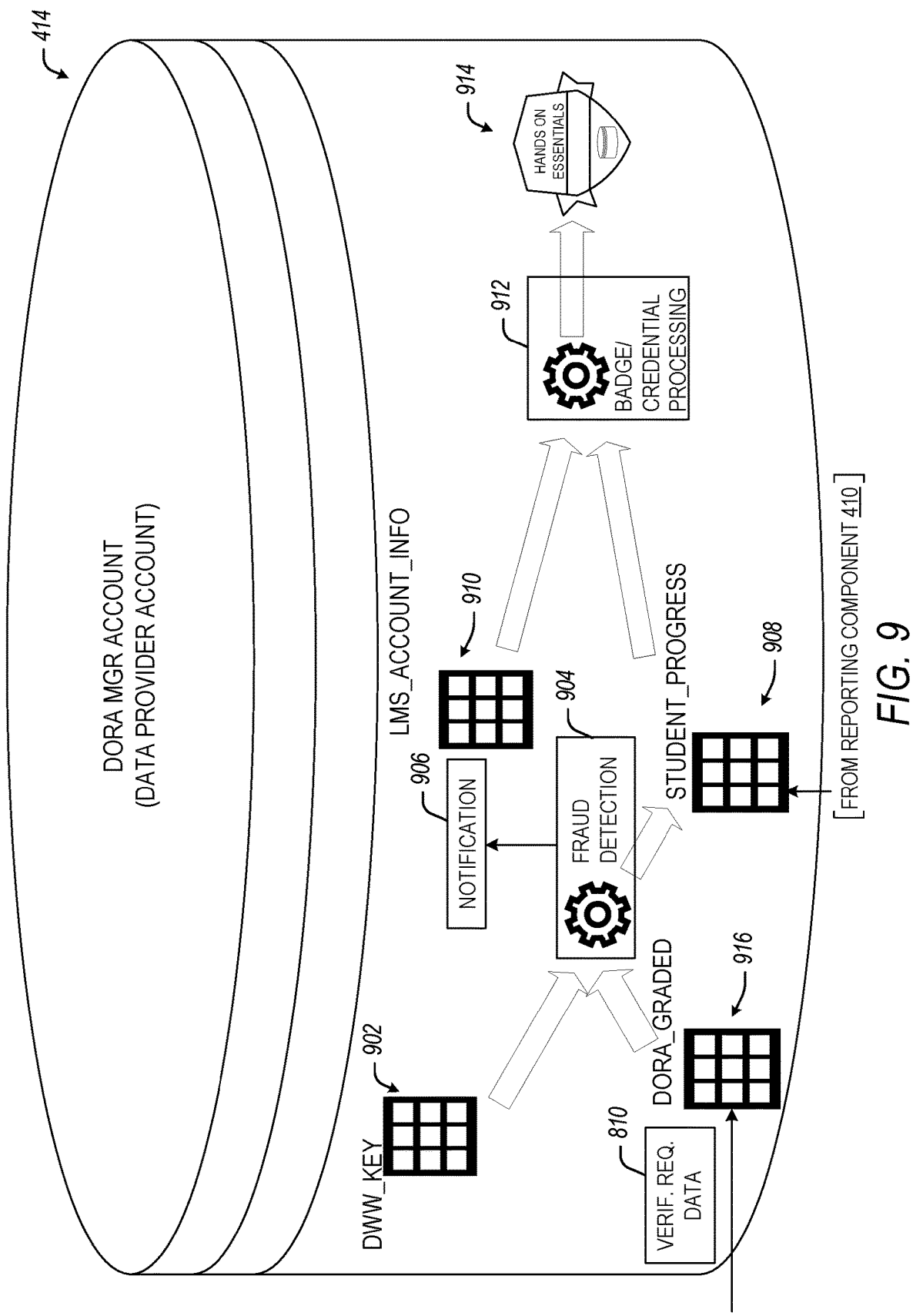
FIG. 9 is a block diagram illustrating the functionalities of the fraud detection and evaluation component and a badge/credential issuing component of the DORA manager used in the network-based database system of FIG. 1, in accordance with some embodiments of the present disclosure.

FIG. 9 is a block diagram illustrating the functionalities of the fraud detection and evaluation component 406 and the badge issuing component 408 of the DORA manager 128 used in the network-based database system of FIG. 1, in accordance with some embodiments of the present disclosure. Referring to FIG. 9, fraud detection and evaluation component 406 maintains table 916 storing the verification request data 810 and table 902 storing authentication data (e.g., hash data) used for performing fraud detection 904.

The fraud detection and evaluation component 406 and the badge issuing component 408 receive the verification request data 810, which is stored in table 916 periodically, as evaluations are performed by the grading Rest API 404. In some aspects, variant and semi-structured query syntax can be used to load the submissions (e.g., the verification request data 810) into table 916 (which can be configured as an event stream table). The records are then analyzed for fraud by performing fraud detection 904. In some aspects, fraud detection 904 is performed by comparing that the "expected" values (e.g., from the revised verification request code 520 received as verification request data 810) match the prescribed (or verified) values (which can be stored in table 902 as expected check values). In some embodiments, fraud detection 904 is performed by checking that the SQL commands in the revised verification request code 520 have not been tampered with and match the expected SQL commands (which can be stored in table 902). A result of the fraud detection 904 can be communicated to the user via notification 906 (which can be separate from or part of the evaluation result 806).

In some aspects, fraud detection 904 can include one or more of the following checks:
(a) Check that the "expected" values for each step (e.g., step DWW05 expected=1) matches the prescribed value. In this regard, table 902 can be used to store a lookup table with graded checks and verified expected values.
(b) Hash of the SQL commands (e.g., the query statement) from the revised verification request code 520 matches a hash of the verified SQL commands (or query statement) as obtained from the metadata. The hash value of the verified SQL commands cannot be tampered with and such commands are provided as inserted metadata (which is not visible and accessible by the user). If the hash of the SQL commands (e.g., the query statement) from the revised verification request code 520 does not match the hash of the verified SQL commands, the task result is failed based on detected fraud.
(c) Check to ensure that current timestamp indicates a pre-configured range of elapsed time to detect if a user is generating the task result too fast or too slow.

In some aspects, fraud detection 904 is performed by the fraud detection and evaluation component 406 before sending a notification to the user of the evaluation result 806. For example, if fraud is detected, the evaluation result 806 will indicate a failed data processing task even if the external function 804 has determined that the task result is correct.

In some aspects, the badge issuing component 408 receives report data (e.g., report data 1006) from reporting component 410 and stores it in table 908. In some aspects, report data can include progress report data (e.g., identification of data processing tasks completed by a user). The badge issuing component 408 performs badge processing 912 by comparing the progress report data from table 908 with badge (or credential) requirements (which can be stored as LMS account data in table 910). If the required/prescribed criteria (as specified in table 910) are met by a user (e.g., as confirmed by the progress report data), the user is issued a badge 914 (which can be a credential). In some aspects, once a learner has completed the required checks satisfactorily, the badge issuing component 408 matches the account of the data consumer to a learner email address and issues badge 914 (e.g., via a Rest API call to a badging/credentials vendor).

In some aspects, metadata stored in the data provider account 414 allows the badge issuing component 408 to check to make sure the validated tests represent a "full set" before marking the set and account of the data consumer as "ready to issue" (before issuing the badge).

In some aspects, the badge issuing component 408 keeps track of badges according to the following criteria:
(a) Registered email of the learner in the LMS 130;
(b) LMS account of learner (e.g., UNI ID of the account); and
(c) A trial account of the user/learner where the lab work (e.g., the data processing task) was performed.

If any of the above three criteria has already received the badge, another badge will not be issued (which can be considered as another fraud detection check).

Figure 10:
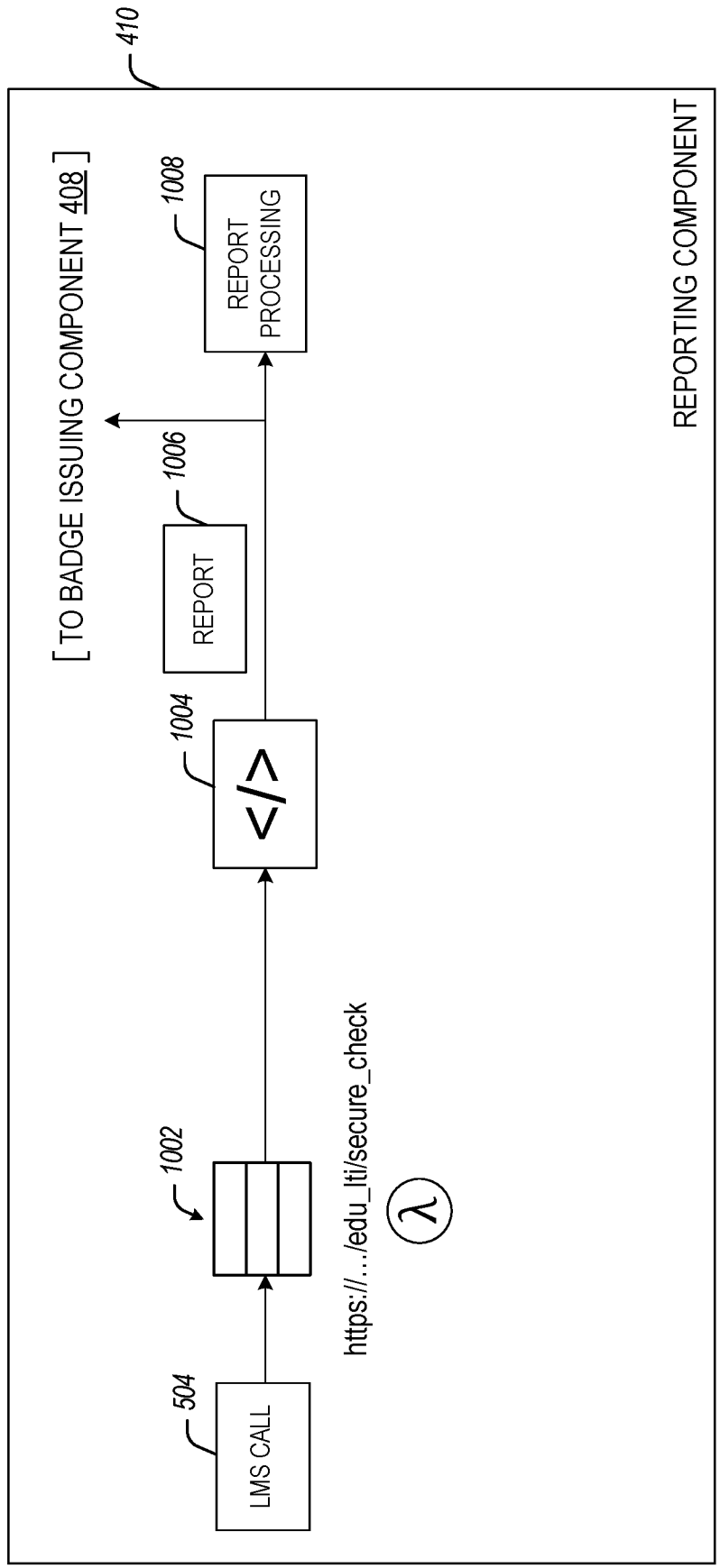
FIG. 10 is a block diagram of a reporting component of the DORA manager used in the network-based database system of FIG. 1, in accordance with some embodiments of the present disclosure.

FIG. 10 is a block diagram of the reporting component 410 of the DORA manager 128 used in the network-based database system of FIG. 1, in accordance with some embodiments of the present disclosure. Referring to FIG. 10, the reporting component receives the LMS call 504, which triggers a call to an external function 1004 via the AWS® Lambda function 1002. The LMS call 504 can include the evaluation of the task result (e.g., a passing indication or a failing indication), which is used by the external function 1004 to generate report data 1006. The report data 1006 is communicated to the badge issuing component 408 and is also used for the additional report processing 1008 (e.g., storing the report data in a log or storage device).

In some aspects, report data 1006 includes one or more reports on all GRADER function runs (e.g., runs of the external function 804), including valid, passed, and failed runs.

Figure 11:
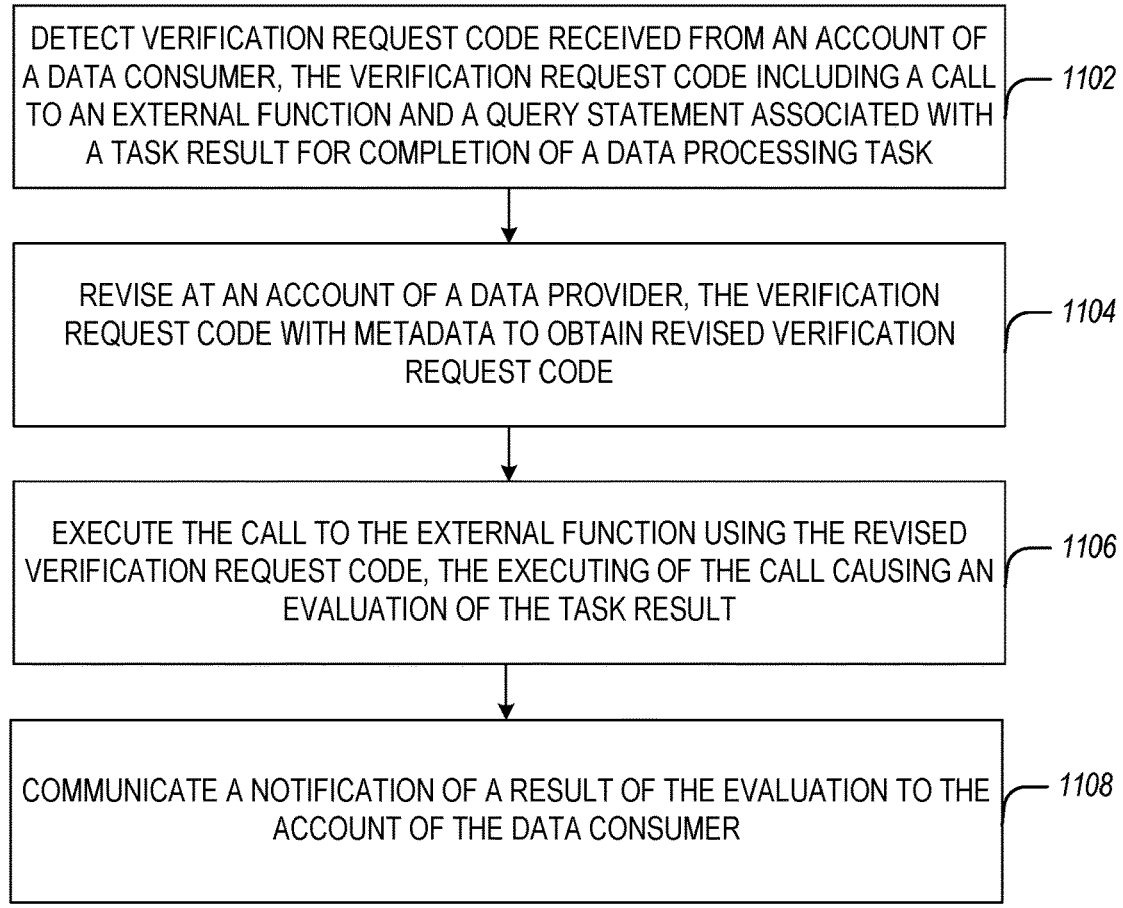
FIG. 11 is a flow diagram illustrating the operations of a database system in performing a method for automated, secure, and credential-less evaluation (e.g., grading) of data processing task results (e.g., student/learner data processing lab result or assignment completion result) in a cloud environment using an LMS, in accordance with some embodiments of the present disclosure.

FIG. 11 is a flow diagram illustrating the operations of a database system in performing method 1100 for automated, secure, and credential-less evaluation (e.g., grading) of data processing task results (e.g., student/learner data processing lab result or assignment completion result) in a cloud environment using an LMS. Method 1100 may be embodied in computer-readable instructions for execution by one or more hardware components (e.g., one or more processors) such that the operations of method 1100 may be performed by components of network-based database system 102, such as components of the compute service manager 108 (e.g., the DORA manager 128) and/or the execution platform 110 (which components may be implemented as machine 1200 of FIG. 12). However, it shall be appreciated that method 1100 may be deployed on various other hardware configurations and is not intended to be limited to deployment within the network-based database system 102.

At operation 1102, a verification request code received from an account of a data consumer is detected. For example, the learner grading component receives verification request code 512 from data consumer account 412. The verification request code 512 includes a call to an external function (e.g., API call 800 to external function 804) and a query statement associated (e.g., SQL commands) with a task result (e.g., task result 508) obtained after completion of a data processing task (e.g., data processing task 506).

At operation 1104, the verification request code is revised (at an account of a data provider) with metadata to obtain a revised verification request code. For example, the verification request code 512 is revised with metadata 702 to obtain a revised verification request code 520.

At operation 1106, the call to the external function (e.g., API call 800 to external function 804) is executed using the revised verification request code 520. The executing of the call causes an evaluation of the task result to generate an evaluation result 806.

At operation 1108, a notification of a result of the evaluation (e.g., the evaluation result 806) is communicated to the account of the data consumer.

Figure 12:
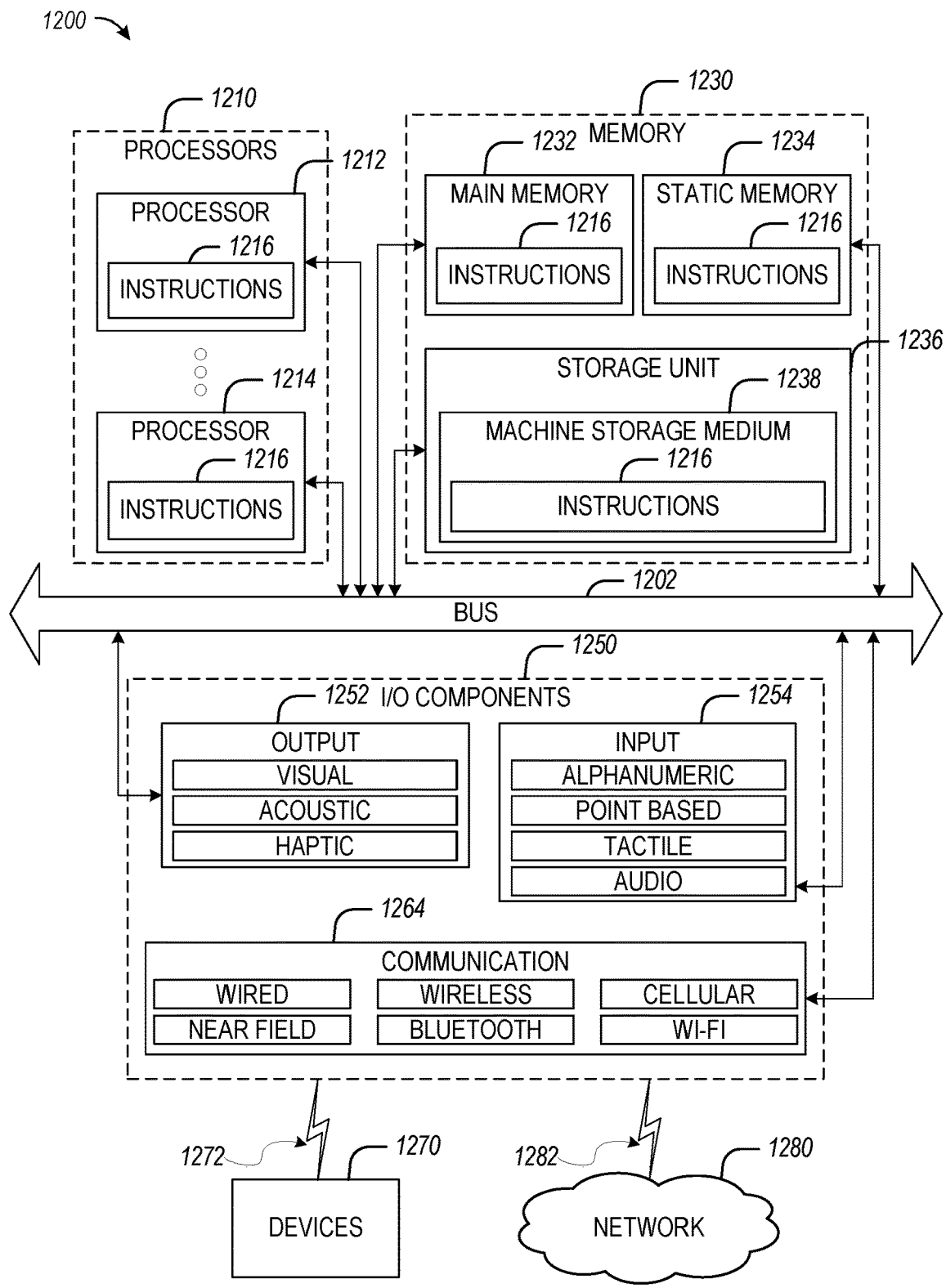
FIG. 12 illustrates a diagrammatic representation of a machine in the form of a computer system within which a set of instructions may be executed for causing the machine to perform any one or more of the methodologies discussed herein, in accordance with some embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of machine 1200 in the example form of a computer system, within which instructions 1216 (e.g., software, a program, an application, an applet, an app, or other executable code) for causing the machine 1200 to perform any one or more of the methodologies discussed herein may be executed. For example, instructions 1216 may cause machine 1200 to execute any one or more operations of method 1100 (or any other technique discussed herein, for example in connection with FIG. 4-FIG. 11). As another example, instructions 1216 may cause machine 1200 to implement one or more portions of the functionalities discussed herein. In this way, instructions 1216 may transform a general, non-programmed machine into a particular machine 1200 (e.g., the compute service manager 108 or a node in the execution platform 110) that is specially configured to carry out any one of the described and illustrated functions in the manner described herein. In yet another embodiment, instructions 1216 may configure the compute service manager 108 and/or a node in the execution platform 110 to carry out any one of the described and illustrated functions in the manner described herein.

In alternative embodiments, the machine 1200 operates as a standalone device or may be coupled (e.g., networked) to other machines. In a networked deployment, machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

Machine 1200 includes processors 1210, memory 1230, and input/output (I/O) components 1250 configured to communicate with each other such as via a bus 1202. In some example embodiments, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within machine storage medium 1238 of the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, and other communication components to provide communication via other modalities. The device 1270 may be another machine or any of a wide variety of peripheral devices (e.g., a peripheral device coupled via a universal serial bus (USB)). For example, as noted above, machine 1200 may correspond to any one of the compute service manager 108 or the execution platform 110, and device 1270 may include the client device 118 or any other computing device described herein as being in communication with the network-based database system 102 or the cloud storage platform 104.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors.

Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1280 or a portion of network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of several well-known transfer protocols (e.g., hypertext transfer protocol (HTTP)). Similarly, instructions 1216 may be transmitted or received using a transmission medium via coupling 1272 (e.g., a peer-to-peer coupling) to device 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: detecting verification request code received from an account of a data consumer, the verification request code including a call to an external function and a query statement associated with a task result obtained after completion of a data processing task; revising at an account of a data provider, the verification request code with metadata to obtain revised verification request code; executing the call to the external function using the revised verification request code, the executing of the call causing an evaluation of the task result; and communicating a notification of a result of the evaluation to the account of the data consumer.

In Example 2, the subject matter of Example 1 includes functionalities further comprising: parsing the query statement to obtain an actual result and an expected result based on the completion of the data processing task.

In Example 3, the subject matter of Example 2 includes functionalities further comprising: performing a comparison of the actual result to the expected result to perform the evaluation; and generating the result of the evaluation based on the comparison.

In Example 4, the subject matter of Examples 1-3 includes functionalities further comprising: retrieving a verified query statement from the account of the data provider, the verified query statement corresponding to the query statement associated with the task result.

In Example 5, the subject matter of Example 4 includes functionalities further comprising: configuring the metadata to include identification information of the account of the data consumer, a current timestamp associated with the detecting of the verification request code, and the verified query statement.

In Example 6, the subject matter of Example 5 includes functionalities further comprising: performing fraud detection associated with the task result based on the metadata.

In Example 7, the subject matter of Example 6 includes functionalities for performing the fraud detection further comprising: performing a comparison between an expected result of the data processing task contained in the query statement and an expected result from the verified query statement; and determining whether the task result is fraudulent based on the comparison.

In Example 8, the subject matter of Examples 6-7 includes functionalities for performing the fraud detection further comprising: performing a comparison between a first hash value generated from the query statement and a second hash value generated from the verified query statement; and determining whether the task result is fraudulent based on the comparison.

In Example 9, the subject matter of Examples 1-8 includes functionalities further comprising: executing the call to the external function specified by the revised verification request code using an application programming interface (API) integration configured at the account of the data consumer.

In Example 10, the subject matter of Example 9 includes functionalities further comprising: causing execution of API code at the account of the data consumer to configure the API integration, the API code provided from the account of the data provider to the account of the data consumer.

Example 11 is a method comprising: detecting verification request code received from an account of a data consumer, the verification request code including a call to an external function and a query statement associated with a task result obtained after completion of a data processing task; revising at an account of a data provider, the verification request code with metadata to obtain revised verification request code; executing the call to the external function using the revised verification request code, the executing of the call causing an evaluation of the task result; and communicating a notification of a result of the evaluation to the account of the data consumer.

In Example 12, the subject matter of Example 11 includes, parsing the query statement to obtain an actual result and an expected result based on the completion of the data processing task.

In Example 13, the subject matter of Example 12 includes, performing a comparison of the actual result to the expected result to perform the evaluation; and generating the result of the evaluation based on the comparison.

In Example 14, the subject matter of Examples 11-13 includes, retrieving a verified query statement from the account of the data provider, the verified query statement corresponding to the query statement associated with the task result.

In Example 15, the subject matter of Example 14 includes, configuring the metadata to include identification information of the account of the data consumer, a current timestamp associated with the detecting of the verification request code, and the verified query statement.

In Example 16, the subject matter of Example 15 includes, performing fraud detection associated with the task result based on the metadata.

In Example 17, the subject matter of Example 16 includes, wherein the performing of the fraud detection further comprises: performing a comparison between an expected result of the data processing task contained in the query statement and an expected result from the verified query statement; and determining whether the task result is fraudulent based on the comparison.

In Example 18, the subject matter of Examples 16-17 includes, wherein the performing of the fraud detection further comprises: performing a comparison between a first hash value generated from the query statement and a second hash value generated from the verified query statement; and determining whether the task result is fraudulent based on the comparison.

In Example 19, the subject matter of Examples 11-18 includes, executing the call to the external function specified by the revised verification request code using an application programming interface (API) integration configured at the account of the data consumer.

In Example 20, the subject matter of Example 19 includes, causing execution of API code at the account of the data consumer to configure the API integration, the API code provided from the account of the data provider to the account of the data consumer.

Example 21 is a computer-storage medium comprising instructions that, when executed by one or more processors of a machine, configure the machine to perform operations comprising: detecting verification request code received from an account of a data consumer, the verification request code including a call to an external function and a query statement associated with a task result obtained after completion of a data processing task; revising at an account of a data provider, the verification request code with metadata to obtain revised verification request code; executing the call to the external function using the revised verification request code, the executing of the call causing an evaluation of the task result; and communicating a notification of a result of the evaluation to the account of the data consumer.

In Example 22, the subject matter of Example 21 includes functionalities further comprising: parsing the query statement to obtain an actual result and an expected result based on the completion of the data processing task.

In Example 23, the subject matter of Example 22 includes functionalities further comprising: performing a comparison of the actual result to the expected result to perform the evaluation; and generating the result of the evaluation based on the comparison.

In Example 24, the subject matter of Examples 21-23 includes functionalities further comprising: retrieving a verified query statement from the account of the data provider, the verified query statement corresponding to the query statement associated with the task result.

In Example 25, the subject matter of Example 24 includes functionalities further comprising: configuring the metadata to include identification information of the account of the data consumer, a current timestamp associated with the detecting of the verification request code, and the verified query statement.

In Example 26, the subject matter of Example 25 includes functionalities further comprising: performing fraud detection associated with the task result based on the metadata.

In Example 27, the subject matter of Example 26 includes functionalities for performing the fraud detection further comprising: performing a comparison between an expected result of the data processing task contained in the query statement and an expected result from the verified query statement; and determining whether the task result is fraudulent based on the comparison.

In Example 28, the subject matter of Examples 26-27 includes functionalities for performing the fraud detection further comprising: performing a comparison between a first hash value generated from the query statement and a second hash value generated from the verified query statement; and determining whether the task result is fraudulent based on the comparison.

In Example 29, the subject matter of Examples 21-28 includes functionalities further comprising: executing the call to the external function specified by the revised verification request code using an application programming interface (API) integration configured at the account of the data consumer.

In Example 30, the subject matter of Example 29 includes functionalities further comprising: causing execution of API code at the account of the data consumer to configure the API integration, the API code provided from the account of the data provider to the account of the data consumer.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    at least one memory storing instructions that cause the at least one hardware processor to perform operations comprising:
        detecting a verification request code received from an account of a data consumer, the verification request code including a call to an external function and a query statement, the query statement comprising a result table with a task result obtained after completion of a data processing task at the account of the data consumer;
        revising, at an account of a data provider, the verification request code with metadata to obtain a revised verification request code, the metadata comprising identification information of the account of the data consumer;
        executing the call to the external function using the revised verification request code, the executing of the call causing an evaluation of the task result based on a comparison of the metadata and the task result; and
        communicating a notification of a result of the evaluation to the account of the data consumer.

2. The system of claim 1, the operations further comprising:
    parsing the query statement to obtain an actual result and an expected result based on the completion of the data processing task.

3. The system of claim 2, the operations further comprising:
    performing a comparison of the actual result to the expected result to perform the evaluation; and
    generating the result of the evaluation based on the comparison.

4. The system of claim 1, the operations further comprising:
    retrieving a verified query statement from the account of the data provider, the verified query statement corresponding to the query statement associated with the task result.

5. The system of claim 4, the operations further comprising:
    configuring the metadata to include a current timestamp associated with the detecting of the verification request code and the verified query statement.

6. The system of claim 5, the operations further comprising:
    performing fraud detection associated with the task result based on the metadata.

7. The system of claim 6, the operations for performing the fraud detection further comprising:
    performing a comparison between an expected result of the data processing task contained in the query statement and an expected result from the verified query statement; and
    determining whether the task result is fraudulent based on the comparison.

8. The system of claim 6, the operations for performing the fraud detection further comprising:
    performing a comparison between a first hash value generated from the query statement and a second hash value generated from the verified query statement; and determining whether the task result is fraudulent based on the comparison.

9. The system of claim 1, the operations further comprising:
executing the call to the external function specified by the revised verification request code using an application programming interface (API) integration configured at the account of the data consumer.

10. The system of claim 9, the operations further comprising:
causing execution of API code at the account of the data consumer to configure the API integration, the API code provided from the account of the data provider to the account of the data consumer.

11. A method comprising:
detecting, by at least one hardware processor, a verification request code received from an account of a data consumer, the verification request code including a call to an external function and a query statement, the query statement comprising a result table with a task result obtained after completion of a data processing task at the account of the data consumer;
revising, at an account of a data provider, the verification request code with metadata to obtain a revised verification request code, the metadata comprising identification information of the account of the data consumer;
executing the call to the external function using the revised verification request code, the executing of the call causing an evaluation of the task result based on a comparison of the metadata and the task result; and
communicating a notification of a result of the evaluation to the account of the data consumer.

12. The method of claim 11, further comprising:
parsing the query statement to obtain an actual result and an expected result based on the completion of the data processing task.

13. The method of claim 12, further comprising:
performing a comparison of the actual result to the expected result to perform the evaluation; and
generating the result of the evaluation based on the comparison.

14. The method of claim 11, further comprising:
retrieving a verified query statement from the account of the data provider, the verified query statement corresponding to the query statement associated with the task result.

15. The method of claim 14 further comprising:
configuring the metadata to include a current timestamp associated with the detecting of the verification request code and the verified query statement.

16. The method of claim 15, further comprising:
performing fraud detection associated with the task result based on the metadata.

17. The method of claim 16, wherein the performing of the fraud detection further comprises:
performing a comparison between an expected result of the data processing task contained in the query statement and an expected result from the verified query statement; and
determining whether the task result is fraudulent based on the comparison.

18. The method of claim 16, wherein the performing of the fraud detection further comprises:
performing a comparison between a first hash value generated from the query statement and a second hash value generated from the verified query statement; and
determining whether the task result is fraudulent based on the comparison.

19. The method of claim 11, further comprising:
executing the call to the external function specified by the revised verification request code using an application programming interface (API) integration configured at the account of the data consumer.

20. The method of claim 19, further comprising:
causing execution of API code at the account of the data consumer to configure the API integration, the API code provided from the account of the data provider to the account of the data consumer.

21. A computer-storage medium comprising instructions that, when executed by one or more processors of a machine, configure the machine to perform operations comprising:
detecting a verification request code received from an account of a data consumer, the verification request code including a call to an external function and a query statement, the query statement comprising a result table with a task result obtained after completion of a data processing task at the account of the data consumer;
revising, at an account of a data provider, the verification request code with metadata to obtain a revised verification request code, the metadata comprising identification information of the account of the data consumer;
executing the call to the external function using the revised verification request code, the executing of the call causing an evaluation of the task result based on a comparison of the metadata and the task result; and
communicating a notification of a result of the evaluation to the account of the data consumer.

22. The computer-storage medium of claim 21, the operations further comprising:
parsing the query statement to obtain an actual result and an expected result based on the completion of the data processing task.

23. The computer-storage medium of claim 22, the operations further comprising:
performing a comparison of the actual result to the expected result to perform the evaluation; and
generating the result of the evaluation based on the comparison.

24. The computer-storage medium of claim 21, the operations further comprising:
retrieving a verified query statement from the account of the data provider, the verified query statement corresponding to the query statement associated with the task result.

25. The computer-storage medium of claim 24, the operations further comprising:
configuring the metadata to include a current timestamp associated with the detecting of the verification request code and the verified query statement.

26. The computer-storage medium of claim 25, the operations further comprising:
performing fraud detection associated with the task result based on the metadata.

27. The computer-storage medium of claim 26, the operations for performing the fraud detection further comprising:
performing a comparison between an expected result of the data processing task contained in the query statement and an expected result from the verified query statement; and
determining whether the task result is fraudulent based on the comparison.

28. The computer-storage medium of claim 26, the operations for performing the fraud detection further comprising:

performing a comparison between a first hash value generated from the query statement and a second hash value generated from the verified query statement; and
determining whether the task result is fraudulent based on the comparison.

29. The computer-storage medium of claim 21, the operations further comprising:
executing the call to the external function specified by the revised verification request code using an application programming interface (API) integration configured at the account of the data consumer.

30. The computer-storage medium of claim 29, the operations further comprising:
causing execution of API code at the account of the data consumer to configure the API integration, the API code provided from the account of the data provider to the account of the data consumer.

* * * * *